United States Patent [19]

Stannard et al.

[11] 4,399,042
[45] Aug. 16, 1983

[54] FILTER DEVICES AND METHODS

[75] Inventors: Forrest B. Stannard, Ft. Lauderdale; Edward J. Highstreet, Coral Springs, both of Fla.

[73] Assignee: The Dehydro Corporation, Charlotte, N.C.

[21] Appl. No.: 312,620

[22] Filed: Oct. 19, 1981

[51] Int. Cl.³ .................... B01D 23/02; B01D 23/24
[52] U.S. Cl. ................................. 210/791; 210/272; 210/408; 210/413; 210/484; 210/496; 210/796
[58] Field of Search ............... 210/791, 796, 272, 406, 210/408, 413, 416.1, 484, 496, 497.01, 498, 500.1, 510

[56] References Cited

U.S. PATENT DOCUMENTS 3,346,121 10/1967 Bally ................................. 210/510
3,412,863 11/1968 Stuart ............................... 210/272
3,547,816 12/1970 Horiguchi et al. ................. 210/272

Primary Examiner—Ivars C. Cintins
Attorney, Agent, or Firm—Carroll F. Palmer

[57] ABSTRACT

Filter elements are constructed of an array of parallel, spaced-apart rods, a plurality of spaced-apart bars fixed to the rods on one side of the array forming a normal to the rods on one side of the array forming a multitude of cavities between the bars and above the surface of the array. Filter media comprising crushed aggregate bound in a matrix of cured resin fills the cavities to just below the plane of the top edge of the bars.

Filter apparatus is provided having a rigid filter bed and including a scraper blade to be moved above the filter bed in contact with the top surface thereof to lift portions of filter cake from the filter bed. The scraper blade includes means to apply a vacuum through a surface of the blade.

A new filtering method applies vacuum to the portions of filter cake lifted by the scraper blade causing relatively rapid removal of filtrate therefrom and producing an incoherent mass of particles of relatively dry filtered material.

17 Claims, 13 Drawing Figures

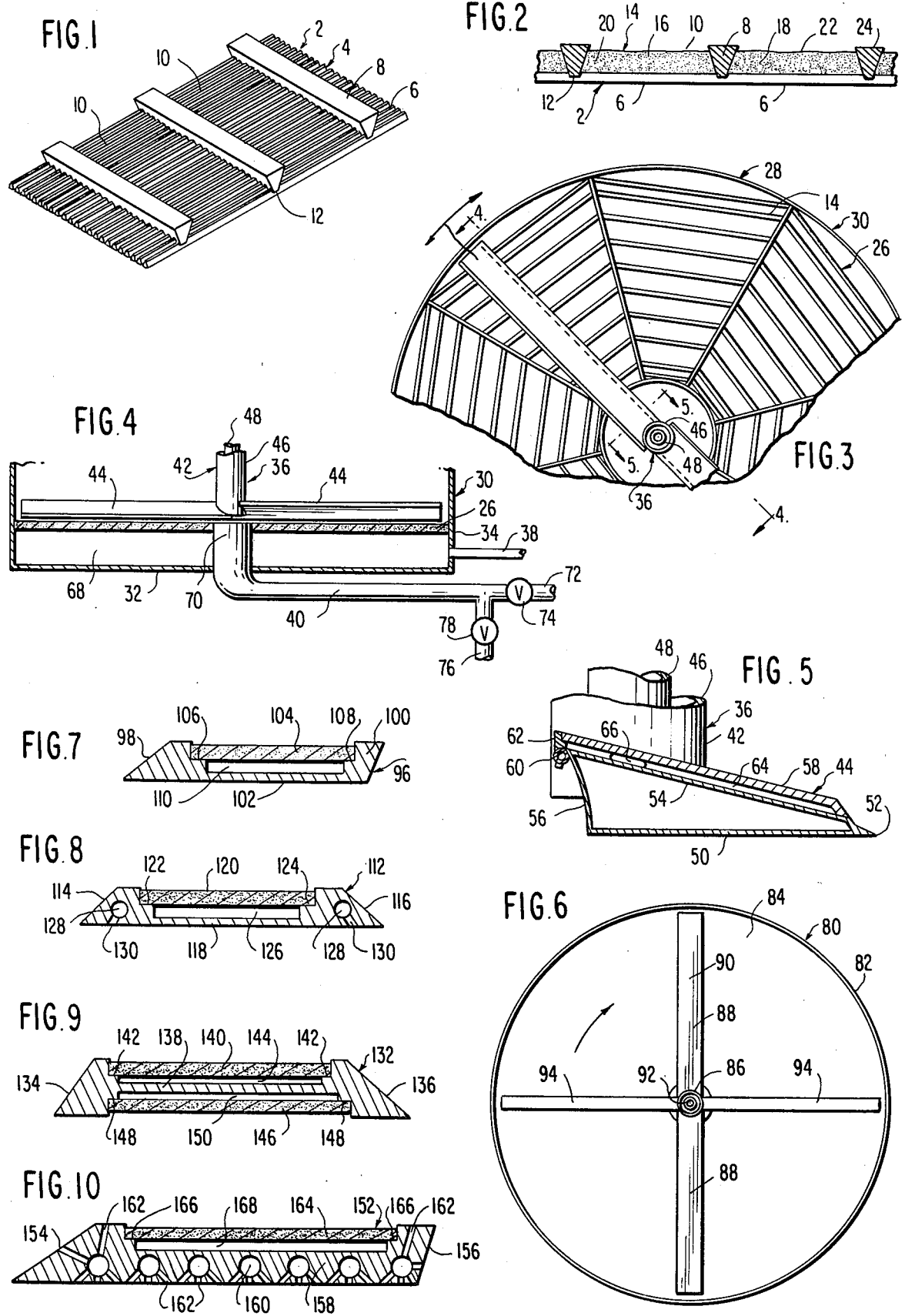

FILTER DEVICES AND METHODS

BACKGROUND OF THE INVENTION

1. Field of the Invention

This invention relates broadly to filter devices and methods. More particularly it concerns (a) methods for the filtering of waster water treatment sludges or similar material that is prone to form filter cake very resistant to the flow of filtrate through it, and (b) devices for filtering such material at a relatively rapid rate to obtain filtered solids of low liquids content.

2. Description of the Prior Art

The handling and treatment of municipal wastewater presents a myriad of problems. Continued residential and commercial developments require the provision of ever increasing wastewater treatment capacity resulting in a corresponding increase in plant effluent and other by-products. The disposal of such materials becomes ever more serious not only because of the increase in their total volume, but also because of the increase in disposal restrictions imposed by environmental regulations.

One major problem in the operation of a wastewater treatment plant is the dewatering of sludge as a step in its ultimate disposal. The term sludge is used to refer to a variety of liquid suspensions containing typically from about 0.1 to 5% dry solids. The identity and nature of the solids vary greatly from plant to plant and with time even in any given treatment plant. Hence, a system for the handling and dewatering of such sludges must be capable of accommodating influent of widely varying nature.

Wastewater treatment sludges can be divided into a few basic types, e.g., alum sludge (chemical), hard sludge, aerobic domestic sewage sludge (bio-mass) and anerobic digested domestic sewer sludge (bio-mass). The present invention relates to new devices and methods capable of handling all of such classes of sludge.

A conventional method for the dewatering of wastewater treatment sludge is filtration through sand beds. The solids in the sludge are invariably of such nature that the resulting filter cake rapidly becomes highly resistant to the flow through it of water with the result that dewatering by conventional sand beds is slow. Hence, sand beds of large area are required to handle a plant's output of sludge. Land acquisition costs, therefore, can be high. Furthermore, back washing and solids removal present constant problems in the operation of the conventional sand beds.

A variety of so-called rapid sludge dewatering systems have been developed, some of which depend upon the use of vacuum to assist in the dewatering. The present invention utilizes the vacuum assist principle for the dewatering of sludge in a unique way that avoids problems of the prior known rapid sludge dewatering systems.

One feature of the new apparatus and methods of the invention is the use of scraper means to assist in the removal of liquid from filtered solids. The broad idea of the use of scrapers or rakes in filtration apparatus is old in the art as shown by U.S. Pat. Nos. 243,233; 293,747; 577,686; 903,697; 1,702,192; 2,309,917; 2,917,177; 3,547,816 and 3,702,135. The present invention concerns scraper devices for filtration apparatus that are uniquely different from all such prior art devices.

While the invention is described with particular reference to wastewater sludge dewatering, the new devices and methods may be effectively used for the filtration of a wide spectrum of other fluid suspensions, especially those that form filter cakes that are prone to be highly resistant to through flow of filtrate.

OBJECTS

A principal object of the present invention is the provision of new improvements in filter devices and methods.

Further objects include the provision of:

1. New methods for the rapid filtration of sewage sludge or similar fluid suspensions prone to form a filter cake resistant to the flow of liquid.
2. New forms of filter elements.
3. New forms of blade means for filtration apparatus to assist in the filtration of solid suspensions that are difficult to filter, such as sewage sludge.
4. New systems for the use of vacuum assist in dewatering of sewage sludge or other filter operations.
5. New forms of filter apparatus comprising unique types of scraper means to improve the efficiency of the apparatus and increase the quantity of influent it may process in a unit time.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

These objects are accomplished in part according to the invention by the provision of filter elements of any desired area configuration constructed of an array of parallel, spaced-apart rods, a plurality of spaced-apart bars fixed normal to the rods on one side of the array forming a multitude of cavities between the bars and the surface of the array. Filter media comprising crushed aggregate, e.g., anthracite of an average size between about 10 to 18 mesh, bound in a matrix of cured epoxy or other resin fills the cavities to just below the plane that defines the top edges of the bars. In a preferred form, the rods are triangular in cross-section, the apexes thereof face and contact the bars and the bars are trapezoidal in cross-section and the shortest parallel sides thereof face said rods.

The objects are further accomplished by providing filter apparatus having a rigid filter bed, e.g., a bed formed of the above described filter elements, including blade means to be moved above the filter bed and in contact with the top surface thereof to lift portions of filter cake that forms on the filter bed. In a preferred embodiment, the filter bed is circular and the blade means comprises a scraper blade that is fixed to and rotated by a vertical shaft concentric with the circular filter bed.

The objects are further accomplished by a new filter method that uses filter apparatus as described above, flowing sewage sludge or other influent onto the top surface of the filter bed of the apparatus, causing filter cake to form on the top surface by removal of filtrate through the filter bed, passing a blade over the top surface of the filter bed to lift portions of the filter cake away from the filter bed, simultaneously with the lifting of filter cake portions, applying a vacuum to such portions to effect removal of further filtrate therefrom continuing the blade passing and vacuum applying until a mass of incoherent particles of filtered material is produced, and removing the mass of incoherent particles from the filter bed. In a preferred embodiment, the top surface of the blade is porous and the vacuum is applied to the lifted portions of filter cake through that porous surface. Also, the trailing edge of the blade is blunt and the removval of the mass of particles is accomplished by reversing the direction of movement of the blade so it plows the particle mass from off the filter bed.

BRIEF DESCRIPTION OF THE DRAWINGS

A more complete understanding of the present invention may be obtained by reference to the accompanying drawings in which:

FIG. 1 is an isometric view of a portion of a filter element constructed in accordance with the invention.

FIG. 2 is a sectional view of a filter element of the invention.

FIG. 3 is a fragmentary plan view of filter apparatus constructed in accordance with the invention.

FIG. 4 is a fragmentary sectional view taken on the line 4—4 of FIG. 3.

FIG. 5 is an enlarged fragmentary sectional view taken on the line 5—5 of FIG. 3.

FIG. 6 is a plan view of other filter apparatus of the invention.

FIG. 7 is a lateral, sectional view of one form of scraper blade of filter apparatus of the invention.

FIG. 8 is a lateral sectional view of another form of scraper blade of the invention.

FIG. 9 is a lateral, sectional view of a further form of scraper blade of the invention.

FIG. 10 is a lateral, sectional view of yet another form of scraper blade of the invention.

DESCRIPTION OF THE PREFERRED EMBODIMENTS

Figure 11:
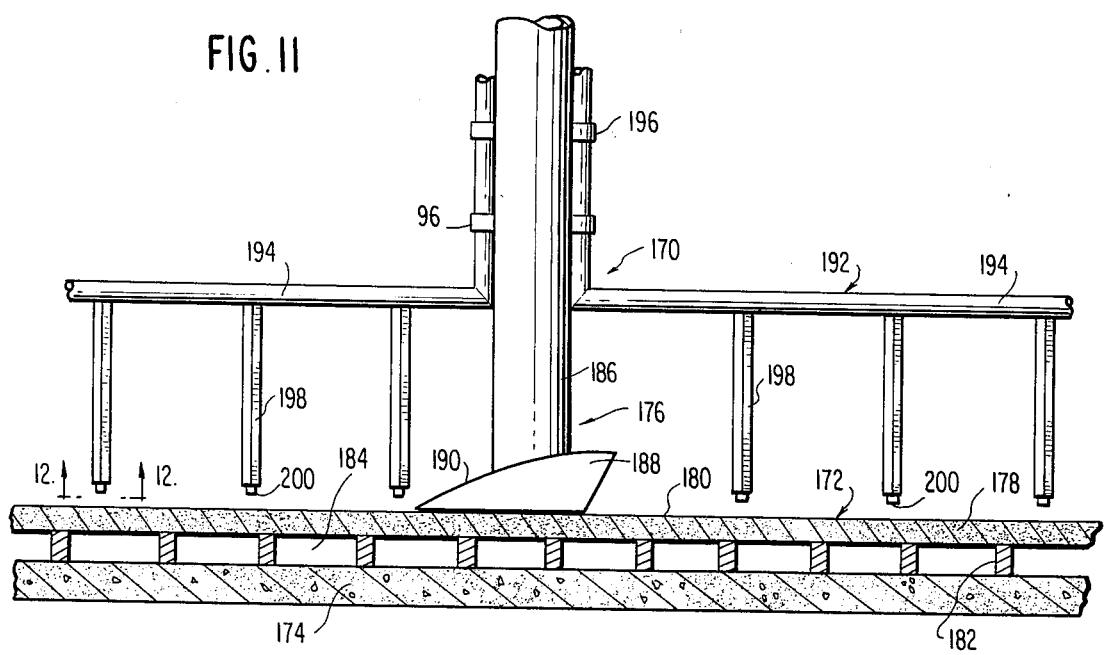
FIG. 11 is a fragmentary, sectional view of another form of filter apparatus of the invention.

Referring in detail to the drawings, the filter element portion 2 comprises an array 4 of substantially parallel, elongated, spaced-apart rods 6. A plurality of spaced-apart bars 8 are fixed to the rods 4 on one side of the array 4 with the longitudinal axes of bars 8 being substantially perpendicular to the longitudinal axes of the rods 6. This arrangement of rods and bars provides a plurality of substantially parallel three-sided cavities 10 on one side of the array 4 defined at their base by the rods 6 and at their longitudinal sides by the bars 8. The bars 8 are preferably trapezoidal in cross-section and the shortest parallel sides 12 thereof face and are connected to the rods 6 so the cavities 10 are wider at their base than at their open faces.

The filter element 14 (see FIG. 2) comprises a filter element portion 2 are described above with the cavities 10 filled from side to side with filter media 16 comprising crushed aggregate 18 bound together in a matrix 20 of cured resin. The top surface 22 is below the plane defined by the top surfaces 24 of the bars 8.

The rods 6 are preferably triangular in shape and their apexes face the bars 8. Advantageously, the bars 8 are fixed to the rods 6 by weldments at the junctions of the rods with the bars.

The crushed aggregate 18 is preferably solid particles of relatively uniform size between about 5 to 35 mesh size (standard sieve) and especially between 10 to 18 mesh size. The crushed aggregate preferably constitutes about 50-95% by weight of the filter media 16.

Crushed anthracite has been found to be particularly useful as the aggregate material, but other materials may be used, e.g., activated carbon, coke, crushed stone, sand, porous ceramic, plastic particles and the like.

The resin preferred for use as the matrix material 20 is epoxy resin. Other resin capable of conversion to a cured condition may be used, e.g., phenol-aldehyde resins, polyester resins, urea-aldehyde resins, resorcinol-aldehyde resins and equivalent curable resins.

The filter element 14 is prepared by forming a flowable mass of uncured resin and crushed aggregate, and filling the cavities 10 in the filter element portion 2 to a depth that approaches, but does not equal, the plane defined by the top surface 24 of the bars 8. Then the filled mass is allowed to stand until the resin cures and forms solid filter media in the cavities 10.

Filter elements 14 produced as described may be formed in a variety of shapes, e.g., rectangular, square, circular, etc. FIG. 3 shows a filter bed 26 of circular shape formed from a plurality of filter elements 14 of trapezoidal shape.

The filter apparatus 28, in addition to filter bed 26, comprises a circular tank 30, having a bottom 32 and side walls 34, scraper means 36, side conduit 38 and bottom conduit means 40.

The scraper means 36 comprises a vertical shaft 42 concentric with the circular filter bed 26 to which is attached blade means 44. The shaft 42 comprises an outer tube 46 and an inner tube 48.

The blade means 44 comprises a bottom web 50, pointed tip 52, upper web 54, rear web 56, porous cap 58, longitudinal tube 60 and lug element 62 which serves to hold the cap 58 spaced from the upper web 54 to provide space 64 beneath the cap 58. An opening 66 connects the space 64 with the interior of tube 46 so that a vacuum can be applied from a suction pump (not shown) to the space 64. This enables water or other liquid to be sucked through the porous cap 58 from fluid containing material that comes into contact with the upper surface of cap 58.

The tube 60 is connected to the tube 48 so that water or other liquid may be delivered via tube 48 to tube 60 to spray through spaced apart holes down onto the top surface of the filter bed 26 as the blade means 44 is rotated by the vertical shaft 42.

The conduit 38 connects to a suction pump (not shown) so that suction may be applied via the chamber 48 to the filter bed 26.

The conduit means 40 opens at its end 70 into the tank 30 at the level of the filter bed. Means 40 comprises one section 72, provided with valve 74, that connects to a source of sewage sludge or other material to be filtered and a second section 76, provided with valve 78, that connects to a suction pump (not shown).

To use the filter apparatus 28, influent to be filtered (dewatered) is charged into the tank 30 above filter bed 26 via section 72 and valve 74 to flow out end 70 of means 40. When the tank 30 has been filled to a suitable level with influent, valve 74 is closed, blade means 44 is rotated by shaft 36 in the direction of tip 52 and suction is applied to the filter bed 26 via conduit 38. Where the influent is sewage sludge of about 1-2% solid content, water will pass through the filter bed 26 and out conduit 38. Water will also pass through porous cap 58 and exit the apparatus via tube 46. As the water removal continues and the sludge reaches a level of about 6% by weight solids, it will become doughlike. Rotation of scraper means 36 causes the blade means 44 to lift the resulting filter cake off the top surface of filter bed 26. This serves to break-up the filter cake and assist in removing further water through the filter bed 26 and the porous cap 58. This process is continued until enough water is removed so the dewatered sludge becomes a mass of incoherent particles with a water content of about 85-90%. At this point the rotation direction of blade means 44 is reversed, suction via conduit 38 is discontinued and valve 78 is opened to apply suction via tube 26 to conduit means 40. Water is also sprayed from tube 60 after sludge is removed from surface 22 to wash the filter elements 14. The rear web 56 of blade means 44 will plow material from the top surface of filter bed 26 and together with water spray from tube 60 will cause the dewatered sludge to discharge from tank 30 via the end 70 of conduit means 40 to exit via tube 76.

Another embodiment of filter apparatus of the invention is shown in FIG. 6. Here the filter apparatus comprises a cylindrical tank 82 containing a filter bed which can be of the type shown in FIG. 3 or a conventional type such as a sand bed. The concentric tube 86 is connected to scraper blades 88 which have porous top surfaces through which liquid may be sucked by vacuum applied to the tube from a suction pump (not shown). The tube 92 connects to the sparger arms 94 so that water or other liquid may be conducted from an external source (not shown) to the sparger arms 94 and sprayed through nozzles on the underside of the arms 94 on to the surface of the filter bed 84 when the filter apparatus 80 is in the wash mode. The blades 88 and arms 94 are rotated by the tubes 86 and 92 which serve as support shafts for the blades and arms. The blades 88 serve to scrape filter cake from the filter bed 84 and remove liquid from it in the same manner as described for blade means 44 of FIGS. 3-5.

FIGS. 7-10 illustrate variations in scraper blades that may be used in the invention. The blade 96 of FIG. 7 comprises a pointed scraper end 98 and trailing end 100 joined together by the integral bottom web 102. A porous plate 109 is supported above the web 102 by ledges 106 and 108 providing a chamber 110 beneath the plate 104. The scraper blade 96 may be carried on a hollow shaft (not shown) to be rotated in a filter tank in a manner similar to that described for blade means 44. The pointed edge 98 lifts filter cake produced in the filter operation and liquid is removed in part from the cake by suction applied to the porous plate 104 via the chamber 110.

The scraper blade 112 of FIG. 8 has two pointed ends 114 and 116 joined by the bottom web 118. The porous plate 120 is positioned above the web 118 on ledges 122 and 124 providing a chamber 126 beneath plate 120. The ends 114 and 116 have horizontal holes 128 and vertical holes 130 drilled in them.

The operation of blade 112 in a filter device is similar to that of blade 96 except that blade 112 can be rotated in either direction and water or other liquid may be sprayed via holes 128 and 130 onto a filter bed to assist in removing filter cake from the bed (not shown). Alternatively, air may be blown through the holes 128 and 130 to assist in breaking up and removing filter cake.

The scraper blade 132 shown in FIG. 9 comprises pointed ends 134 and 136 joined by the central web 138. An upper porous plate 140 is carried above the web 138 on ledges 142 providing a first inner chamber 144. A lower porous plate 146 is carried on ledges 148 beneath the web 138 providing a second inner chamber 150.

The use of the blade 132 in filter operations is similar to that of blade 96 except that liquid may be removed from filter cake through both the porous plates 140 and 146 via suction applied to chambers 144 and 150 respectively.

The scraper blade 152 of FIG. 10 comprises a pointed scraper end 154 and blunt trailing end 156 joined by a bottom web 158 which has horizontal holes 160 and transverse holes 162 drilled therein. The porous plate 164 is carried on ledges 166 above the web 158 providing an inner chamber 168 beneath the plate 164.

The use of scraper blade 152 in filter operations is similar to that of blade 96 except that water, air, vacuum, etc., may be applied through holes 160 and 162 to assist in forming and/or removing filter cakes from a filter bed.

The porous caps 58 and porous plates shown in FIGS. 7-10 may be made of a variety of materials. For example, they may be sintered metal, fritted glass, microporous plastic, plates or sheets of aggregate bound in a plastic matrix or the like. They should possess a porosity that will allow water to pass through them while retaining substantially all of the solids present in the influent to the filter apparatus. A porosity comparable to that of filter element 14 is advantageous. Such porous caps and plates may be fixed to the adjoining structures, e.g., cap 58 fixed to web 54, by welding, adhesives, screws, bolts or other fasteners or in any other suitable manner.

The scraper blades of the invention comprising a porous surface have been described above as rotating on a vertical shaft. However, this new form of scraper blades for use with filter apparatus having a rigid filter bed may also operate in rectangular or square tanks as reciprocating blades, oscillating blades or longitudinally conveyed blades upon suitable tracks, racks, chain conveyors or the like. Rubber or other flexible hoses may be used in such cases to apply vacuum or convey air or wash water to the blades to permit them to function in a manner as described above for rotary blades.

Although the use of the new suction-type scraper blades of the invention has been described in connection with the new filter elements 4, these blades may also be advantageously used with other types of flat rigid filter elements. One specific type of filter element suitable for use with the new blades is the PVC grating filter media described and claimed in our co-pending application entitled "Filter Media and Filter Apparatus", Ser. No. 294,039, filed Aug. 18, 1981, now U.S. Pat. No. 4,340,478, the disclosure of which is incorporated herein by reference.

The new suction blades of the invention provide some unique results in the filtering of sewage sludge and other forms of influent that produce filter cake that rapidly creates headloss in the filter operation. The new blades when rotating or crossing over the filter surface moves the drier filter cake (sludge) from the filter surface, controlling the filter cake formation and allowing filtrate (water) to pass readily through newly exposed filter surface while permitting new wet sludge to come in contact with the filter surface. During the process, the filter cake is subjected to a rolling action resulting in the formation of balls of filtered solids as the dewatering continues. The use of these new blades with a rigid type filter bed reduces to a matter of hours what takes days with conventional sand bed filters to accomplish in the dewatering of sewage sludge.

Figure 12:
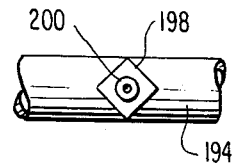
FIG. 12 is an enlarged, fragmentary, sectional view taken on the line 12—12 of FIG. 11.

Further improvements in new filtration methods of the invention may be attained with another embodiment of the invention as shown in FIGS. 11 and 12. The filter apparatus 170 comprises a filter bed 172, concrete tank floor 174 and rotary blade means 176.

The filter bed 172 comprises rigid filter media 178 having a relatively flat upper surface 180 and is supported on the tank floor 174 by stringers 182 providing a filtrate drain space 184 beneath the filter media 178.

The blade means 176 comprises a hollow vertical shaft 186 to which is attached the scraper blade 188. Preferably the upper surface 190 of the blade 188 is of porous type as described above so that suction may be applied to it via the hollow shaft 186.

The blade means 176 also comprises rake means 192 comprising the pipes 194 fixed to the shaft 186 by straps 196. Diamond shaped tubes 198 depend from the pipes 194 and carry nozzles 200 at their lower ends. Nozzles may also be carried along the sides of tubes 198. Alternatively, the tubes instead of being diamond shape can be in the form of flat vanes and such vanes can be attached to the pipes 194 in a manner that permits the vanes to be turned at any desired angle relative to their direction of travel as the pipes 194 are rotated. Such positioning of the vanes (not shown) can be used to move filtered solids toward or away from the filter tank walls.

The apparatus 170 is used by charging the tank (not fully shown) of which the floor 174 is the bottom with sewage sludge or other influent to be filtered. As the filling of the tank progresses, the blade means 176 remains stationary to permit the larger particles in the influent to fall upon the surface 180 of the filter bed 172. Filtrate will at the same time begin to pass through the filter media into the effluent space 184 from which it may be removed via suitable conduits (not shown). Vacuum may be applied to the space 184 to help draw filtrate from the influent.

When the tank has been filled to a suitable height, typically 3 to 4 feet, rotation of the blade means 176 is begun by rotation of shaft 186 by suitable drive means (not shown). At the same time suction is applied via shaft 186 to porous blade surface 190 and air is blown via pipes 196 and tubes 198 through the nozzles 200. The combined action of the blade 188 and rake means 192 functions to assist the filter bed in removing filtrate from the influent. Where the influent is sewage sludge, such action produces sludge movement greatly decreasing the dewatering time that would be required in the absence of the action of blade 188 and rake means 192. The vertical vanes 198 serve to break up the filter mass as it dewaters by physical deflection. Air supplied through nozzles 200, in addition to having a drying effect on the filter mass, also aids in the breakup.

Various methods and devices may be used to remove the mass of incoherent particles of solid filtered material formed in filter apparatus as herein described. For example, with reference to FIGS. 3–5, the plough side of blade means 44 may be used to push the particles and in conjunction with water sprayed from tube 60 the particles will be carried out the conduit 40 via the central opening 70 in the filter bed 26. Alternatively, bulldozers, backhoes, shovels and similar handling equipment may be used to unload the resulting particle mass from the filter tank.

Figure 13:
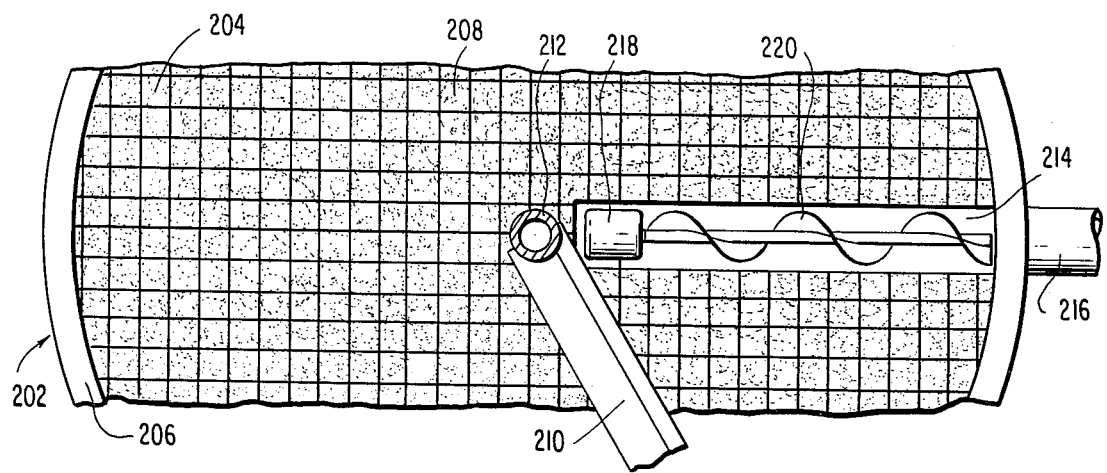
FIG. 13 is a fragmentary plan view, partly in section, of yet another form of filter apparatus of the invention.

Yet another means of removing the particle mass is illustrated in FIG. 13. The filter apparatus 202 comprises a circular tank 204 defined by side walls 206 and filter bed 208. The bed 208 is the aggregate filled grid type of filter media described in our co-pending application Ser. No. 294,039 mentioned previously. The apparatus also comprises a rotary scraper blade 210 constructed in accordance with the invention carried on the hollow, rotatable shaft 212.

The filter bed 208 is interrupted by a gutter 214 that extends downwardly below the top level of the bed 208. The gutter discharges into the outlet conduit 216 which is supplied with suitable flow control valve (not shown). Positioned in the gutter 214 is a submergeable motor 218 that is attached to and drives the screw feeder 220. The blade 210 may be used to push filter cake particles formed in the tank 204 to gutter 214 and rotation of the feeder 220 will serve to discharge such material out the conduit 216.

The embodiments of the invention in which an exclusive property or privilege is claimed are defined as follows:

1. A substantially planar filter element comprising:
   an array of multiplicity of substantially parallel, elongated, spaced-apart rods,
   a plurality of spaced-apart bars fixed to said rods on one side of said array with the longitudinal axes of said bars being substantially perpendicular to the longitudinal axes of said rods,
   a plurality of substantially parallel three-sided cavities on said one side of said array defined at their base by said rods and at their longitudinal sides by said bars, the space between said longitudinal sides being greater at the base of said cavities than at the open face thereof, and
   filter media comprising crushed aggregate bound in a matrix of cured resin filing said cavities from side to side, but with the top surface of the filter media being below the plane defined by the surfaces of said bars distal of their fixation to said rods.

2. A filter element of claim 1 wherein said rods are triangular in cross-section and the apexes thereof face said bars.

3. A filter element of claim 2 wherein said bars are trapezoidal in cross-section and the shortest parallel sides thereof face said rods.

4. A filter element of claim 3 wherein said bars are fixed to said rods by weldments at the junctions of said bars with said rods.

5. A filter element of claim 1 wherein said filter media is formed of crushed anthracite having a size between about 10 to 18 mesh bound in a matrix of cured epoxy resin.

6. Filter apparatus comprising a filter bed formed of filter elements as defined in claim 1,
   blade means to move above the top surface of said filter bed substantially in contact with said surfaces of said bars distal of their fixation to said rods, and
   drive means to move said blade means.

7. Filter apparatus of claim 6 wherein said filter bed is substantially circular in shape, said blade means rotates about an axis concentric with said circular filter bed and said drive means comprises a concentric shaft to which the blade means is fixed.

8. Filter apparatus comprising:
a circular filter bed,
rotary blade means positioned above the top surface of said filter bed,
a shaft to which said blade means is fixed,
means to rotate said shaft and move said blade means over the top surface of said filter bed, in both a clockwise and counter-clockwise direction,
said blade means comprising a blade having a first pointed, scraping, longitudinal edge and a second blunt, plowing, longitudinal edge.

9. Filter apparatus of claim 8 wherein said blade comprises an elongated internal cavity and an elongated porous surface covering said internal cavity through which liquid that contacts said porous surface may pass into said internal cavity.

10. Filter apparatus of claim 9 having means to apply a vacuum to said internal cavity to cause liquid to pass through said porous surface.

11. Filter apparatus of claim 8 wherein said blade means comprises means to spray water upon the top surface of said filter bed as said blade means is rotated over the surface of the filter bed.

12. A method of filtering influent material prone to form a fluid flow resistant filter cake which comprises:
providing a flat, horizontal, rigid filter bed,
flowing influent onto the top surface of said filter bed and causing a filter cake to form on said surface by removal of filtrate from said influent through said filter bed,
passing a blade over said top surface of said filter bed to lift portions of said filter cake away from said filter bed,
simultaneously with said lifting of filter cake, applying a vacuum through a porous surface in said blade to the lifted portions of filter cake to effect removal of further filtrate therefrom,
continuing said blade passing and vacuum applying until a mass of incoherent particles of filtered material is produced, and
removing said mass of incoherent particles from said filter bed.

13. The method of claim 12 wherein said blade has a blunt trailing edge and said mass removal is accomplished by reversing the direction of passage of said blade over said filter bed and said mass of particles is plowed from said top surface by said blunt trailing edge.

14. The method of claim 13 wherein water is sprayed from the trailing edge of said blade during a washing step of the method.

15. The method of claim 12 wherein the top surface of said blade is porous and vacuum is applied to said lifted portions of filter cake through said porous surface.

16. The method of claim 12 wherein said filter bed is circular in shape and said blade is fixed to vertical shaft concentric with said circular filter bed and said blade is passed over said top surface by rotation of said shaft.

17. Filter apparatus for filtering influent that forms a filter cake appreciably resistant to the passage of filtrate which comprises:
a flat, rigid, horizontal filter bed,
a scraper blade having a longitudinal edge in contact with the top surface of said filter bed,
a porous surface in said scraper blade,
a means to apply a vacuum through said porous surface, and
means to move said scraper blade over the surface of said filter bed.

* * * * *